United States Patent
Velusamy et al.

(10) Patent No.: US 11,689,580 B1
(45) Date of Patent: Jun. 27, 2023

(54) USE OF ALTERNATE VOIP CALL-PLACEMENT SERVICE IN RESPONSE TO IMS PROCESSING FAILURE

(71) Applicant: Sprint Spectrum L.P., Overland Park, KS (US)

(72) Inventors: Saravana Velusamy, Overland Park, KS (US); Sreekar Marupaduga, Overland Park, KS (US); Rajil Malhotra, Olathe, KS (US)

(73) Assignee: Sprint Spectrum LLC, Bellevue, WA (US)

( * ) Notice: Subject to any disclaimer, the term of this patent is extended or adjusted under 35 U.S.C. 154(b) by 0 days.

(21) Appl. No.: 17/456,294

(22) Filed: Nov. 23, 2021

Related U.S. Application Data

(63) Continuation of application No. 16/948,342, filed on Sep. 14, 2020, now Pat. No. 11,218,516.

(51) Int. Cl.
*H04L 65/1016* (2022.01)
*H04L 65/1069* (2022.01)
*H04L 65/1033* (2022.01)
*H04L 65/1104* (2022.01)

(52) U.S. Cl.
CPC ........ *H04L 65/1016* (2013.01); *H04L 65/104* (2013.01); *H04L 65/1069* (2013.01); *H04L 65/1104* (2022.05)

(58) Field of Classification Search
CPC ............. H04L 65/1016; H04L 65/1104; H04L 65/104; H04L 65/1069; H04L 65/1006; H04L 65/1073; H04L 65/1076

USPC .......................................................... 709/352
See application file for complete search history.

(56) References Cited

U.S. PATENT DOCUMENTS

| | | | |
|---|---|---|---|
| 7,480,510 B1 | 1/2009 | Woleben et al. | |
| 11,140,574 B1* | 10/2021 | Sharma | H04W 80/08 |
| 2014/0219273 A1* | 8/2014 | Ku | H04L 65/1069 370/352 |
| 2016/0080576 A1* | 3/2016 | Yasrebi | H04L 47/125 370/229 |
| 2016/0105468 A1* | 4/2016 | Mufti | H04L 65/80 709/228 |

* cited by examiner

*Primary Examiner* — Glenford J Madamba
(74) *Attorney, Agent, or Firm* — McDonnell Boehnen Hulbert & Berghoff LLP

(57) ABSTRACT

A method and system for responding to a processing failure of an Internet Protocol (IP) Multimedia Subsystem (IMS). An example method includes a computing system detecting the processing failure of the IMS and responsively causing one or more user equipment devices (UEs) to forgo using the IMS for voice over IP (VoIP) call placement and to instead use an alternate VoIP calling service for VoIP call placement. For instance, a given UE may be configured by default to use the IMS for VoIP call placement, but the UE may detect an IMS processing failure and may responsively instead make a next VoIP call placement attempt using an alternate VoIP calling service, such as a third party VoIP calling application running on the UE.

20 Claims, 5 Drawing Sheets

USE OF ALTERNATE VOIP CALL-PLACEMENT SERVICE IN RESPONSE TO IMS PROCESSING FAILURE

REFERENCE TO RELATED APPLICATION

This is a continuation of U.S. patent application Ser. No. 16/948,342, filed Sep. 14, 2020, the entirety of which is hereby incorporated by reference.

BACKGROUND

A cellular communication system operated by a wireless service provider typically includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, the system could include a core network having a user-plane subsystem that provides connectivity between the access nodes and various application servers and/or transport networks, and a control-plane subsystem for managing UE and core-network service. With this arrangement, a UE within coverage of the system could engage in air-interface communication with an access node and could thereby communicate via the access node and core network with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers. And on the downlink and uplink, the air interface provided by an access node on a given carrier could be configured to define physical resources for carrying information, including control-plane signaling and user-plane traffic, wirelessly between the access node and UEs.

When a UE first enters into coverage of such a system, the UE could detect coverage of an access node and then engage in random-access signaling and connection signaling with the access node to establish an air-interface connection (e.g., Radio Resource Control (RRC) connection) defining a logical tunnel for carrying communications wirelessly between the UE and the access node. Further, the UE could engage in attachment or registration signaling via the access node with a core-network controller. And the core-network controller could responsively engage in signaling to set up for the UE one or more default bearers each defining a logical packet tunnel extending between the UE and the user-plane subsystem of the core network, to enable the UE to engage in packet-data communications through the core network.

OVERVIEW

To facilitate voice over Internet Protocol (VoIP) call communication by served UEs, such a cellular communication system could additionally include or be connected with an Internet Protocol (IP) Multimedia Subsystem (IMS) having a media server and signaling proxies for setting up and connecting VoIP calls. An IMS could support industry standard packet-based signaling and bearer communication protocols, such as Session Initiation Protocol (SIP) signaling and Real-time Transport Protocol (RTP) bearer communication for instance. And the IMS could be coupled with both the user-plane subsystem and control-plane subsystem of the core network, to allow the IMS to engage in both user-plane communication with served UEs and control-plane signaling with the core network.

When a VoIP-capable UE registers with the core-network controller, the core-network controller could set up at least two default bearers for the UE—a general "Internet" bearer for carrying general Internet communications, and an IMS signaling bearer for carrying IMS signaling such as SIP signaling between the UE and the IMS—with each bearer having respective quality of service (QoS) attributes. Further, the UE could then engage in SIP signaling to register with the IMS via the UE's IMS signaling bearer (e.g., transmitting a SIP REGISTER message to the IMS), in response to which the IMS could reserve resources to serve the UE and establish a record indicating where the UE can be reached for incoming VoIP calls, among other functions.

Once a UE is IMS registered, when a user of the UE then invokes a telephone application of the UE to place a voice call to a remote party, the UE could responsively engage in SIP signaling with the IMS to set up the call, which may result in setup of an RTP session (or the like) defining a first call leg between the UE and the IMS, setup of another call leg between the IMS and the called party, and the IMS bridging those two call legs together to provide an end-to-end voice call path. (Alternatively, the signaling may result in a more direct end-to-end RTP session or the like between the UE and the called party, with signaling control anchored at the IMS.) In addition, typically as an integral part of this process, the IMS could signal to the core network control-plane subsystem to cause setup for the UE of a new, dedicated IMS bearer with a high QoS level for carrying voice packets (i.e., packetized voice) of the call between the UE and the core-network gateway system.

With the voice call path set up between the UE and the remote party, via the core network and IMS, and with the dedicated IMS bearer set up for carrying voice packets of the call between the UE and the user-plane subsystem of the core network, the UE could then engage in voice call communication with the remote party, with voice packets flowing between the UE and the IMS via the UE's dedicated IMS bearer, and with the IMS bridging that voice communication with the remote party.

Unfortunately, a technical problem that can arise in this or similar systems is that, for one reason or another, UE placement of VoIP calls in through the IMS could fail.

Such failure could occur because of a server error, routing error, or other provisioning or processing error in a signaling proxy or other node in the IMS and/or elsewhere in a signaling path associated with IMS call setup, among other possibilities. For instance, such an error could prevent proper SIP signaling to set up an attempted VoIP call and/or could prevent signaling between the IMS and the core network to setup up an IMS dedicated bearer for an attempted VoIP call.

Further, these or other problems leading to failure of VoIP call setup through the IMS could grow exponentially, as UEs retry VoIP call placement after experiencing call setup failure. For instance, when a UE initiates SIP signaling (e.g., sending a SIP INVITE message) to the IMS to place a VoIP call, the UE may expect to receive certain response SIP signaling (e.g., a SIP 183 SESSION PROGRESS message and/or a SIP 180 RINGING message) within a short timeout period, and if the UE does not receive that SIP signaling within the timeout period, the UE may consider the call placement to have failed and may restart—sending a SIP INVITE again to the IMS. And if a UE experiences such failure of VoIP call setup through the IMS, the UE may ultimately conclude that the UE is not properly registered with the IMS, so the UE may attempt IMS registration again (e.g., sending a new SIP REGISTER message to the IMS). As many UEs experience these or other such issues, the IMS and/or associated nodes could thus become overloaded with SIP signaling (e.g., SIP INVITE messages and SIP REGISTER messages), which could exacerbate the problem.

The present disclosure provides a mechanism to help address this or similar situations. In accordance with the disclosure, a computing system will detect an IMS processing failure and will responsively take action to cause one or more UEs to place their VoIP calls instead using a VoIP call placement service other than the IMS. UEs would still place VoIP calls via their existing cellular connections and through the core network. But the UEs could instead place those VoIP calls using a different VoIP call placement service, such as FACETIME, WHATSAPP, GOOGLE DUO, SKYPE, SLACK, or the like. Further, as the UEs would be placing VoIP calls without use of the IMS, both their voice call setup signaling and voice packets of their VoIP calls would likely flow over the UEs' default Internet bearers rather than over IMS related bearers.

In an example implementation, the computing system could be provided at a UE.

In this implementation, the UE could be configured by default to use the IMS for VoIP call placement as noted above for instance. But the UE could detect what the UE might consider to be an IMS processing failure by detecting one or more instances of the UE attempting VoIP call placement through the IMS and each such VoIP call placement attempt failing—e.g., with the UE not receiving expected SIP signaling within a timeout period as noted above. And in response to detecting such failure, the UE could then automatically reconfigure itself from being set to use the IMS for VoIP call placement to instead being set to use a different VoIP call placement service (i.e., other than the IMS) for VoIP call placement.

Accordingly, for a next attempt by the UE to place a VoIP call (possibly a re-try of a just-failed attempt), the UE would use the different VoIP call placement service rather than the IMS. In this reconfigured mode of operation, for instance, for a VoIP call to a called party, the UE could determine from address-book data and/or other application data that the called party can be reached through another VoIP call placement service such as one of those noted above. And, perhaps after prompting for and receiving user approval, the UE could then automatically place the VoIP call to the called party using that other VoIP call placement service rather than the IMS.

In another example implementation, the computing system could be provided at a network entity such as one to or through which SIP signaling related to IMS voice call setup would pass en route to/from served UEs. Examples of such an entity include a gateway or user plane function of the core-network user-plane subsystem, a firewall, a router, or an IMS node such as a proxy server or the like, among other possibilities.

In this implementation, the network entity could detect the occurrence of a SIP signaling overload condition with respect to numerous UEs, which might suggest IMS processing failure as noted above. For instance, applying deep packet inspection or more directly reading SIP signaling en route from served UEs, the network entity could detect that at least a threshold number of UEs per unit time have each been sending to the IMS at least a threshold number of SIP messages (e.g., SIP INVITE messages and/or SIP REGISTRATION messages) per unit time. And in response, the network entity could engage in signaling to cause one or more such UEs to reconfigure themselves as noted above, to forgo use of the IMS for voice call placement and thus to instead use a different VoIP call placement service for next VoIP call placement attempts.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
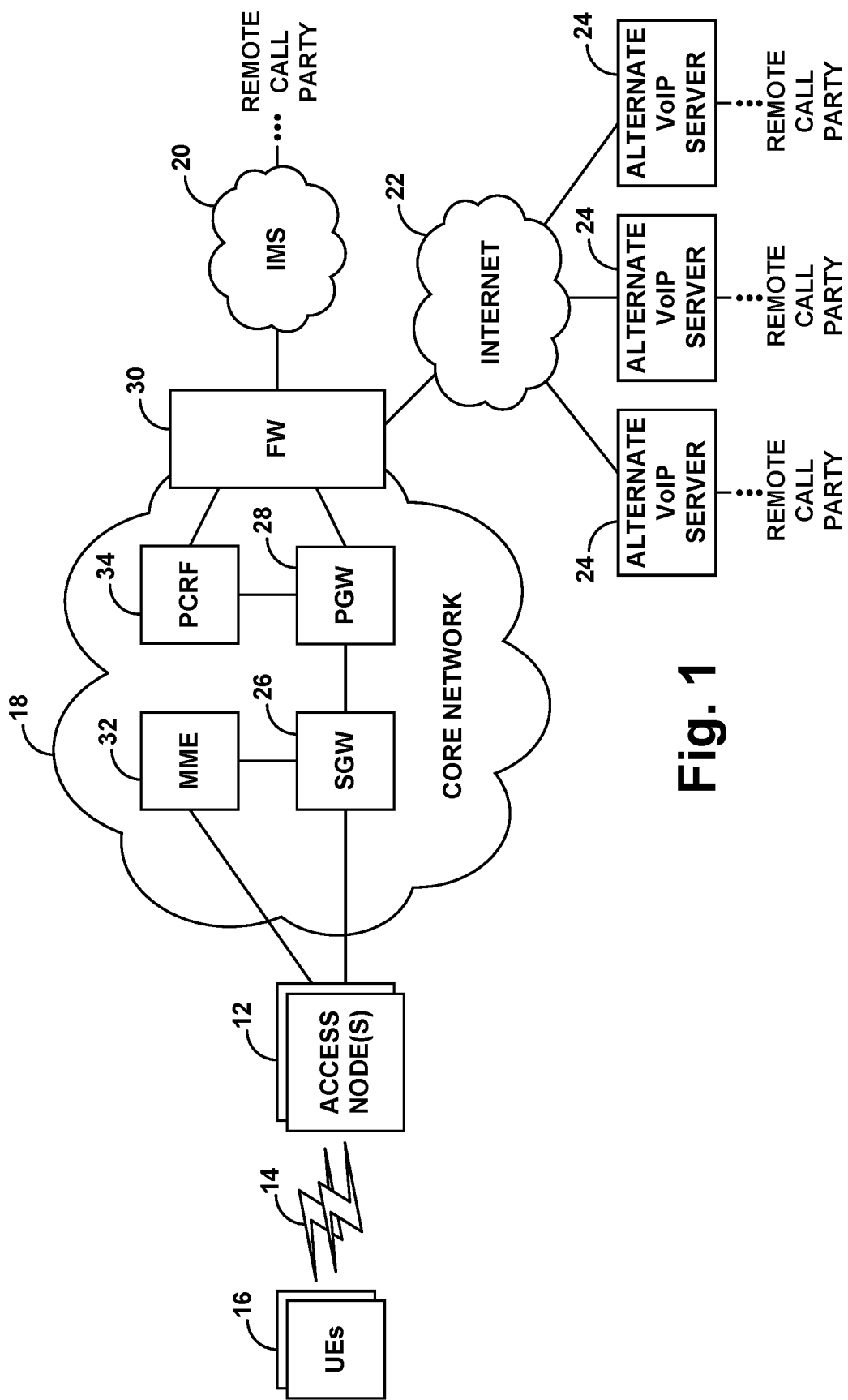
FIG. 1 is a simplified block diagram of an example network arrangement in which features of the present disclosure can be implemented.

Referring to the drawings, as noted above, FIG. 1 is a simplified block diagram of an example network arrangement in which the features of the present disclosure can be implemented. It should be understood, however, that numerous variations from this and other disclosed arrangements and operations could be possible. For instance, various system components and process steps could be added, removed, combined, distributed, re-ordered, or otherwise modified. In addition, it will be understood that operations described herein as being carried out by one or more entities could be carried out in various ways, such as by a processing unit (e.g., one or more microprocessors) programmed with software instructions and/or by various hardware and/or other components.

As shown in FIG. 1, the example arrangement includes one or more access nodes 12 each configured to provide respective coverage 14 in which to serve UEs 16. And the example arrangement further includes a core network 18 that provides connectivity between the access nodes 12 and one or more application servers and/or transport networks. In particular, the core network 18 is shown providing connectivity with an IMS 20 and with the public Internet 22. And further, the Internet 22 is shown providing connectivity with alternate VoIP application servers 24.

In the arrangement shown, the access nodes 12, core network 18, and IMS 20 may be owned and operated by a common wireless service provider, such as a cellular carrier, to which the UEs 16 subscribe for service. Whereas, the alternate VoIP application servers could be owned and operated by other entities. Alternatively, one or more of the alternate VoIP application servers could be affiliated with or co-owned by the wireless service provider.

In an example implementation, the access nodes 12 could take various forms, such as macro access nodes of the type configured to provide a wide range of coverage, or small cell access nodes, relays, femtocell access nodes, or the like, possibly configured to provide a smaller range of coverage, among other possibilities. Each access node could thus have a respective antenna structure that is configured to transmit and receive electromagnetic signals in a region defined by an antenna pattern or radiation pattern. And each access node could provide coverage on at least one carrier according to a respective RAT, such as one of those noted above, among other possibilities.

Further, the core network 18 could be a packet-switched network such as an evolved packet core (EPC) network or a next generation core (NGC) network, among other possibilities, on which each access node 12 and various core-network entities could have an assigned Internet Protocol (IP) address, and through which entities could communicate through virtual packet tunnels or the like.

Without limitation, FIG. 1 illustrates the core network 18 as an EPC network.

As shown, the EPC network has a user-plane subsystem including a serving gateway (SGW) 26 and a packet data network gateway (PGW) 28. With this arrangement, each access node 12 could have a communication interface with the SGW 26, the SGW 26 could have a communication interface with the PGW 28, and the PGW 28 could provide connectivity through one or more intervening network elements (e.g., routers, firewalls, or the like) 30 with the IMS 20 and with the Internet 22. Thus, the user-plane subsystem could provide a path for communication of user-plane data between the access nodes 12 and the IMS 20 and Internet 22.

Further, the EPC network has a control-plane subsystem including a mobility management entity (MME) 32 and a policy and charging rules function (PCRF) 34, as well as control-plane functions (not shown) of the SGW 26 and the PGW 28. The MME 32 could have a communication interface with each access node 12 and with the SGW 26, to facilitate bearer setup and session management, among other functions. The PCRF 34 could have a communication interface with the PGW 28, to facilitate policy control and network-initiated bearer setup, among other functions. And the control-plane functions of the SGW 26 and PGW 28 could facilitate control operations such as assignment of IP addresses to UEs and signaling related to setup and management of bearers.

In an alternative implementation, with an NGC network, other core-network entities could be provided. For instance, the user-plane subsystem could include a user plane function (UPF) in place of the user-plane functions of the SGW 26 and PGW 28, and the control-plane subsystem could include an access and mobility function (AMF) in place of certain functions of the MME 32 and a session management function (SMF) in place of other functions of the MME 32 and in place of certain control-plane functions of the SGW 18 and PGW 20. Other arrangements are possible as well.

In line with the discussion above, when a UE enters into coverage of such a system, the UE could detect threshold strong coverage of an access node 12 providing service according to a particular RAT, and the UE could then responsively engage in random-access and RRC connection signaling with the access node, to establish an air-interface connection through which the access node 12 could then serve the UE with wireless packet data communications. Further, the UE could engage in attach signaling with the MME 32, via the UE's RRC connection with the access node, to register for service with the core network.

As noted above, as part of this attachment process, the MME 32 could coordinate setup for the UE of various bearers defining logical packet tunnels through which the UE could engage in packet-data communications.

For each such bearer, for instance, the MME 32 could engage in signaling with the UE's serving access node 12 and the SGW 26, to coordinate setup of an S1-U packet tunnel between the access node 12 and the SGW 26. Further, the SGW 26 could responsively engage in signaling with the PGW 28 coordinate setup of corresponding S5 packet tunnel, and the access node could responsively engage in signaling with the UE to coordinate setup of a corresponding data radio bearer (DRB) over the UE's air interface connection. And as part of this process, the PGW 28 could assign an IP address for use by the UE to engage in packet-data communications and various entities in the bearer communication path could establish for the UE a context record specifying information about the bearer, such as UE identity, bearer identity, and the like.

As further noted above, each such bearer could have an associated QoS level. In particular, each bearer could have a designated quality of service class indicator (QCI), which could represent the bearer's QoS level and may range from QCI 1 as a highest QoS level to QCI 9 as a lowest QoS level. And entities along the bearer path could store in their context records a representation of the bearer's QCI or a corresponding differentiated service point code (DSCP) value and could accordingly apply the associated QoS level for handling packet communications along the bearer.

As indicated above, when a VoIP capable UE attaches, the MME 32 could initially establish for the UE two default bearers, a general Internet bearer and an IMS signaling bearer. For instance, the MME 32 could establish for the UE a QCI-9 bearer as the general Internet bearer, and the MME 32 could establish for the UE a QCI-5 bearer as the IMS signaling bearer.

Once the UE is connected with the access node 12 and registered with the core network 18, the access node 12 could then provide the UE with wireless packet data communication service. For instance, when the UE has packet data to transmit to a remote entity, the UE could engage in signaling with the access node 12 to transmit the data over an appropriate bearer, and the access node could coordinate air-interface transmission of the data from the UE to the access node 12 and could then forward the data along the bearer through the core network 18 for output by the PGW 28. And when the PGW 28 receives packet-data for transmission to the UE, the PGW 28 could forward the data along an appropriate bearer through the core network 18 to the access node 12, and the access node could coordinate air-interface transmission of the data to the UE.

Continuing with reference to FIG. 1, as noted above, the IMS 20 serves to support real-time packet based communication services such as VoIP call communication. As such, the IMS 20 could comprise a number of servers or server functions, likewise interconnected on a packet-switched network for instance. And as shown in FIG. 1, the IMS 20 could provide voice call connectivity with remote call parties. Thus, when a VoIP-capable UE is connected with an access node 12 and registered with the core network 18, the UE could register with the IMS 20 and could then place and receive VoIP calls through the IMS 20.

Figure 2:
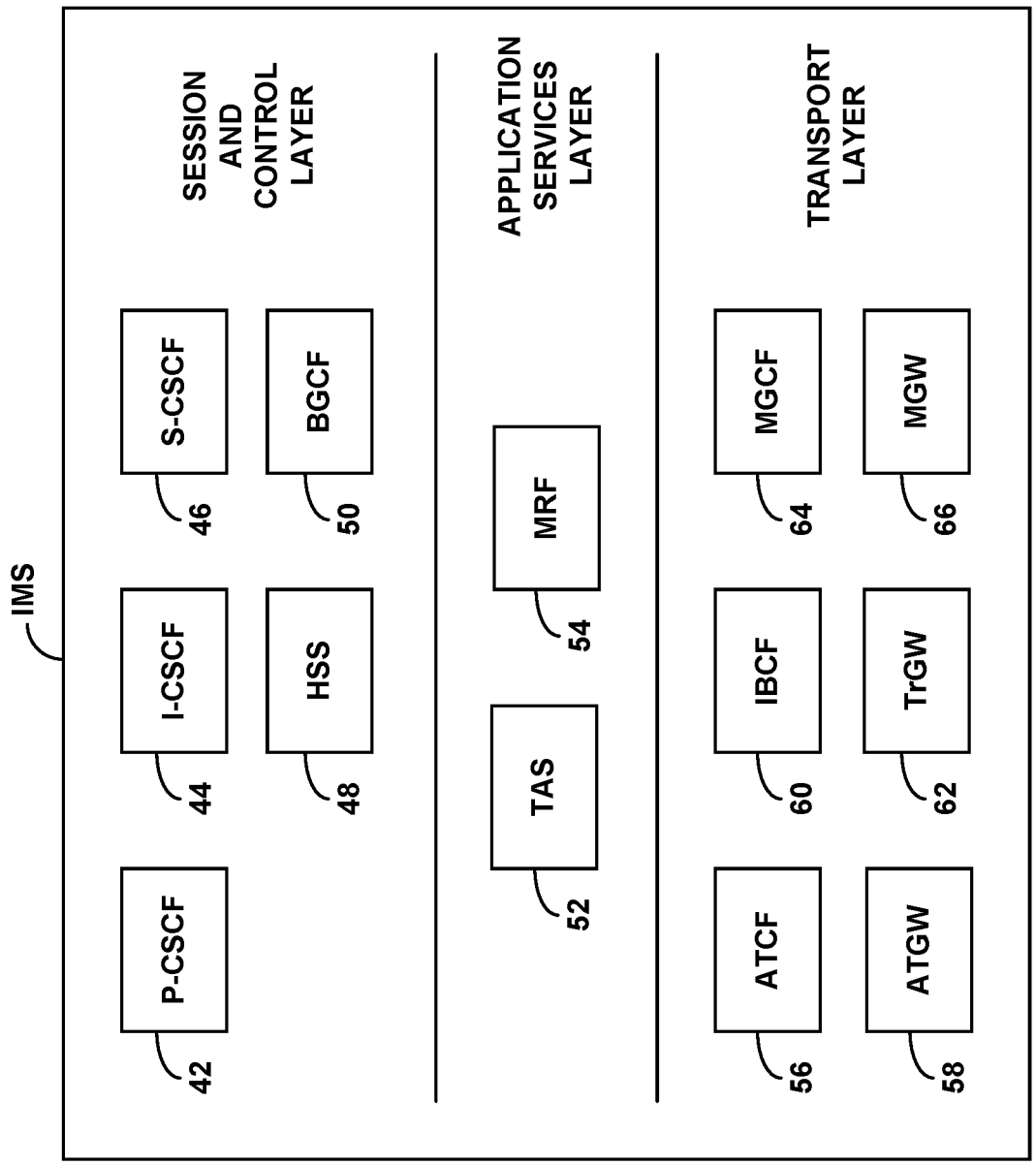
FIG. 2 is a simplified block diagram depicting components of an example IMS.

FIG. 2 illustrates elements of an example IMS 20. As shown in FIG. 2, the IMS elements could define a session and control layer 36, an application and services layer 38, and a transport layer 40. The session and control layer 36 could include various call session control functions (CSCFs) such as a proxy CSCF (P-CSCF) 42, an interrogating CSCF (I-CSCF) 44, and a serving CSCF (S-CSCF) 46, as well as a home subscriber server (HSS) 48 and a breakout gateway control function (BGCF) 50. The application and services layer 38 could include a telephony application server (TAS) 52 and a media resource function (MRF) 54. And the transport layer 40 could include an access transfer control function (ATCF) 56 and access transfer control gateway (ATGW) 58, an interne border control function (IBCF) 60 and a transition gateway (TrGW) 62, and a media gateway control function (MGCF) 64 and media gateway (MGW) 66.

In the illustrated session and control layer 36, the CSCFs 42, 44, 46 could be advanced SIP proxy servers, responsible for session setup, teardown, control, and registration. The P-CSCF 42 could be a first point of entry for session and control signaling between the IMS 20 and the core network 18 and could function to validate SIP messages and route the messages to other SIP servers in the IMS. The I-CSCF 44 could function to select the S-CSCF 46 (from multiple S-CSCFs) to serve a UE, based on subscriber profile data provided by the HSS 48 for instance, and to route SIP messaging to selected S-CSCF 46. And the S-CSCF 46 could function as an anchor SIP server for certain UEs. Further, the BGCF 50 could function to help the S-CSCF 46 route SIP messages to various control functions of the transport layer 40.

In the illustrated application and services layer 38, the TAS 52 and MRF 54 could then cooperatively provide VoIP telephony service as a representative IMS application. For instance, the TAS 52 could be responsible for controlling setup of RTP sessions to facilitate VoIP call communication, and the MRF could be responsible for call conferencing, call announcements, and other features.

And in the illustrated transport layer 40, the various control functions and gateways could function to support and control media connections, such as RTP legs with served UEs and call legs with remote call parties. In a representative implementation, for instance, the ATCF 56 and ATGW 58, which could be logically collocated with the P-CSCF 42, could cooperatively interact with the core network 18, as the first point of IMS entry for media communication with the PGW 28. The IBCF 60 and TrGW 62 could then cooperatively provide a media transport interface with other IMS networks to facilitate call connections with other IMS-served call parties, and the MGCF 64 and MGW 66 could cooperatively provide a media transport interface with the public switched telephone network (PSTN), to facilitate call connections with legacy telephony devices.

Once a VoIP-capable UE has an established IMS bearer as noted above, the UE could then register with the IMS 20. For instance, the UE could transmit a SIP REGISTER message to an address of the P-CSCF 42, as user-plane packet-data communication. And the P-CSCF 42 could forward the SIP REGISTER message to the I-CSCF 44, which could query the HSS 48 to determine an S-CSCF 46 to serve the UE, and the I-CSCF could then pass the SIP REGISTER message to that S-CSCF 46. Further, the S-CSCF 46 may could also query the HSS to obtain a profile record for the UE, and the S-CSCF 46 could respond with a SIP 200 OK message, which could pass to the I-CSCF 44, to the P-CSCF 42, and back through the core network 18 and over the air to the UE.

In turn, a UE that is registered with the IMS 20 could place a VoIP call via the UE's air-interface connection, the core network, and the IMS 20, through SIP signaling with the IMS 20.

For instance, the UE could originate a VoIP call to remote call party by transmitting to the P-CSCF a SIP INVITE including a SIP telephone number associated with the remote call party. That SIP INVITE could then pass via the ATCF 56 logically co-located with the P-CSCF 42 to the UE's S-CSCF 46 and in turn to the TAS 52. And the TAS 52 could then engage in third party call control to set up the voice call including a call leg between the UE and the ATGW 58 and a call leg between the ATGW 58 and the remote party through the TrGW 62 or MGW 66 for instance.

As part of this call setup process, additional SIP signaling could conventionally pass between the IMS 20 and the UE. For instance, after the UE's SIP INVITE passes from entity to entity along the SIP signaling path, each entity could respond to the preceding entity in the SIP signaling path with a SIP 100 TRYING message, so part of the process could involve a SIP 100 TRYING message passing back from the P-CSCF 42 to the UE, to inform the UE that session setup is being attempted. Further, after receipt of the UE's SIP INVITE message, the S-CSCF 46 could receive a SIP 183 SESSION PROGRESS message, which could pass to the P-CSCF 42 and in turn to the UE. And when the called party phone is ringing, the S-CSCF 46 could receive a SIP 180 RINGING message, which could likewise pass to the P-CSCF 42 and in turn to the UE. In addition, once the called party answers the call, the S-CSCF 46 could receive a SIP 200 OK message, which could likewise pass to the P-CSCF 46 and to the UE. And the UE could then respond with a SIP ACK message, which could propagate along the SIP signaling path, with associated signaling to complete setup of the call.

In addition, this SIP signaling could conventionally result in a process to trigger setup for the UE of a dedicated IMS bearer through which the UE could engage in the VoIP call. For instance, when the P-CSCF 42 receives a SIP 183 SESSION PROGRESS message for a VoIP call being set up for the UE, the P-CSCF 42 could responsively signal to the PCRF 34 of the core network 18 to trigger this bearer setup. In response, the PCRF 34 could transmit to the PGW 20 a bearer setup request, requesting setup of a QCI-1 dedicated IMS bearer for the UE, and associated bearer setup signaling could propagate from the PGW 20 to the SGW 18 and to the MME 32. The MME 32 could then engage in a process as noted above to coordinate setup for the UE of this dedicated IMS bearer, with associated signaling between the access node 12 and the UE and between the SGW 18 and the PGW 20 for instance.

Once the UE's VoIP call has been set up through the IMS and the UE's dedicated IMS bearer has been set up over the air and through the core network 18, the UE could then engage in the VoIP call with the remote party. Namely, voice packet data could flow from the UE, over the UE's dedicated IMS bearer through the core network, to the IMS and from the IMS to the remote call party, and vice versa.

Referring further to FIG. 1, the various alternate VoIP application servers 24 could function to provide third party VoIP call services, separate from the IMS 20. As noted above, examples of these services could include without limitation FACETIME, WHATSAPP, GOOGLE DUO, SKYPE, and SLACK. And as shown, each of these VoIP application servers 24 could provide voice call connectivity with remote call parties, which could include at least some of the same remote call parties to which the IMS 20 could provide voice call connectivity.

Each of these alternate VoIP call servers could be configured to serve client devices running associated alternate VoIP-service application logic. For instance, a FACETIME server could be configured to serve client devices running a FACETIME application, a WHATSAPP server could be configured to serve client devices running a WHATSAPP application, and so forth.

Each such VoIP call service could operate according to a subscription and presence model by which the application logic running on client devices could be registered for service with an associated VoIP call server and could engage in presence signaling to alert the associated VoIP call server when the application is running and available to engage in VoIP service. Further, the various alternate VoIP call services could operate with open signaling and VoIP communication protocols such as SIP and RTP or could use proprietary signaling and/or VoIP communication protocols.

Figure 3:
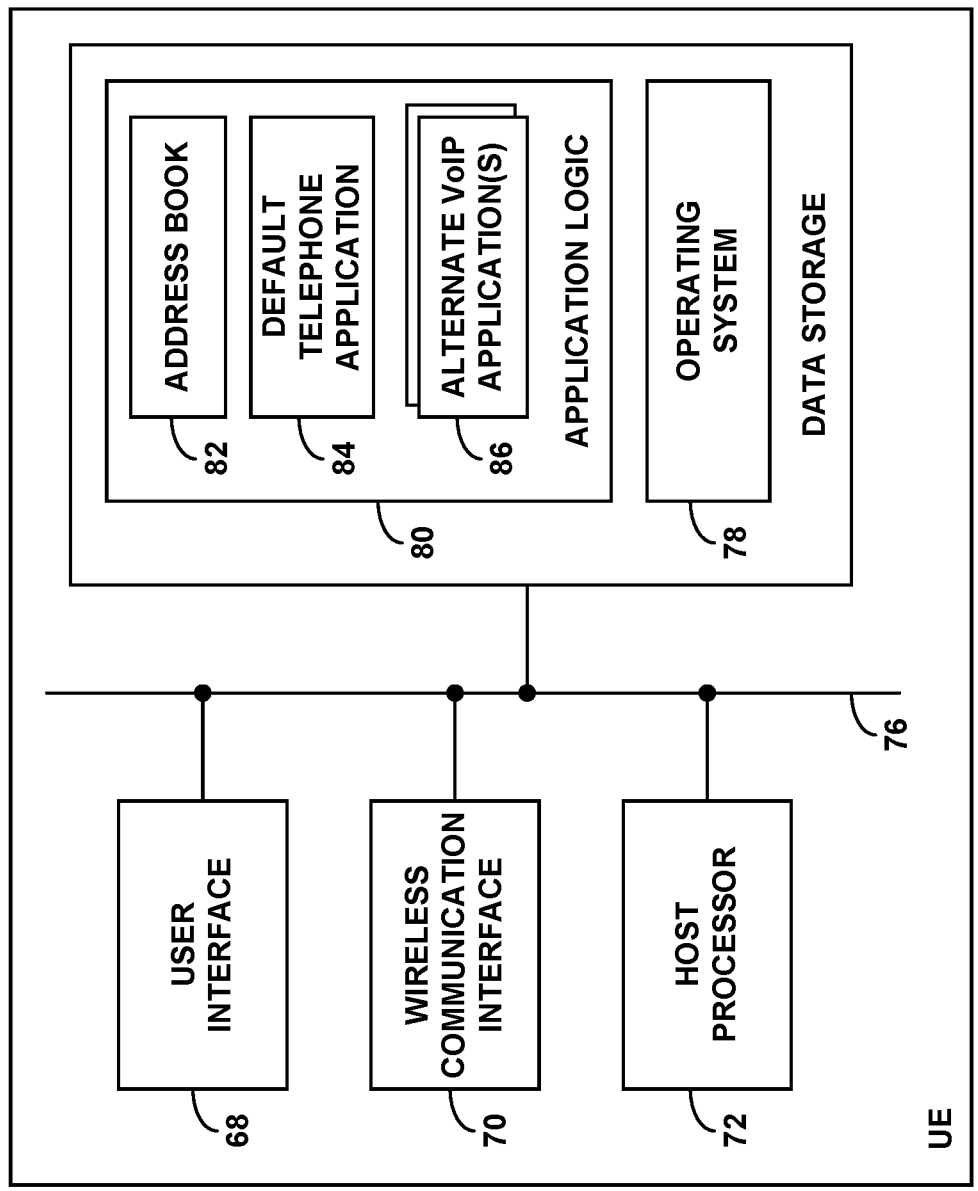
FIG. 3 is a simplified block diagram depicting components of an example UE.

FIG. 3 is next a simplified block diagram of an example UE 16 that could subscribe to service of the wireless service provider noted above. Namely, FIG. 3 illustrates some of the components that could be included in such a UE to facilitate operation according to the present disclosure.

As shown in FIG. 3, the example UE includes a user interface 68, a wireless communication interface 70, a host processor 72, and non-transitory data storage 74, all of which could be integrated together or communicatively linked together by a system bus or other connection mechanism 76.

With this arrangement, the user interface 68 could include input components such as a touch screen display, microphone, and buttons, and output components such as a display and sound speaker. Further, the wireless communication interface 70 could comprise a radio, associated circuitry, and an antenna structure, for engaging in air-interface communication according to a RAT such as one of those noted above for instance. The host processor 72 could then comprise one more microprocessors or dedicated signal processors. And the non-transitory data storage 74 could comprise one or more volatile and/or non-volatile data storage components.

As further shown, data storage 74 of the example UE includes an operating system 78 and application logic 80, which could be executable by the host processor 72 to carry out various UE operations. In the example arrangement shown, the application logic 80 includes an address book application 82, a default telephone application 84, and various alternate VoIP applications 86.

With this arrangement, the address book application 82 could store contact records, each including a contact name and associated telephone number, among other information.

Further, the default telephone application 84 could be a default telephone application of the UE, which a user of the UE could invoke to place a voice call to a called party by interaction with an associated telephone interface and/or through selection of a telephone call option in an address-book contact entry, among other possibilities.

This default telephone application 84 could be configured by default to place and receive VoIP calls through the IMS 20, being pre-provisioned with an IP address of the P-CSCF for instance to facilitate SIP signaling and so forth. Thus, upon setup of a default IMS bearer for the UE, this default telephone application 84 could engage in the SIP registration process as noted above to register the UE with the IMS 20. And when a user invokes the default telephone application 84 to place a VoIP call to a remote party, the default telephone application 84 could engage in the SIP signaling as noted above to originate and thus place that VoIP call through the IMS 20.

The various alternate VoIP applications 86, on the other hand, could be third party VoIP calling applications such as those noted above, perhaps a FACETIME application, a WHATSAPP application, a GOOGLE DUO application, and so forth, which a user could opt to use instead when desired to place a VoIP call to a remote party. As noted above, each such alternate VoIP application might register with its associated alternate VoIP call server, to facilitate engaging in VoIP call service provided by that server. Further, each of these alternate VoIP applications on the UE could define an application programming interface (API) accessible by other application logic on the UE to facilitate interaction with the alternate VoIP application.

As noted above, the present disclosure provides various mechanisms to help address an IMS processing failure.

In practice, an IMS processing failure could result from a server error in the IMS 20 and/or in an IMS or core-network entity that sits within a representative SIP communication path, among other possibilities. And the IMS processing failure could comprise or result in failure of IMS signaling, such as failure to deliver and/or receive certain expected SIP messages during IMS registration or VoIP call setup.

For instance, when a UE attempts to place a VoIP call through the IMS, the IMS processing failure could involve one or more IMS entities failing to deliver expected SIP messages such as SIP 100 TRYING, SIP 183 SESSION PROGRESS, SIP 180 RINGING, and/or SIP 200 OK, and thus the UE failing to receive one or more such expected messages. And the IMS processing failure could further lead to failure to set up a dedicated IMS bearer for the UE. Further, as noted above, when such failures occur, the failure condition could grow exponentially as the UEs may repeatedly retry VoIP call initiation and/or may repeatedly try IMS registration, with the associated signaling possibly leading to an IMS overload condition that could cause additional problems.

As indicated above, the disclosed mechanisms could involve a computing system detecting an IMS processing failure and responsively causing one or more UEs to forgo use of the IMS 20 for VoIP call placement and to instead engage in VoIP call placement using an alternate VoIP call placement service such as one of those noted above.

In an example implementation, the computing system could be implemented at a representative UE such as that shown in FIG. 3. For instance, the computing system could be provided by the UE's host processor and by specialized application logic such by a specialized version of the default telephone application 84 noted above.

In this implementation, for example, the default telephone application 84 could include a Boolean configuration setting that indicates whether or not the default telephone application 84 is to place calls through the IMS 20.

In normal operation, this configuration setting could indicate that the default telephone application 84 should place calls through the IMS 20. Thus, whenever a user of the UE uses the default telephone application 84 to place a call to a called party, the UE, executing the default telephone application 84, could engage in the process noted above, sending a SIP INVITE message to the P-CSCF 42 to initiate the call, and then engaging in further expected SIP signaling, concluding with sending a SIP ACK message to complete setup of the call, at which point the user could then engage in the call.

Per the present disclosure, however, the UE could detect an IMS processing failure in relation to that IMS call setup process. For instance, as noted above, the UE could detect that the UE does not receive one or more expected SIP messages, possibly upon expiration of a predefined timeout period. And as another example, the UE could detect that the UE does not receive signaling from its serving access node 12 for setup of an associated dedicated IMS bearer for the attempted call, again possibly upon expiration of a predefined timeout period. Whether this processing failure is actually a failure at the IMS or is a failure at some other point in related signaling paths or the like, the UE could deem this to be an IMS processing failure or the like for present purposes.

Upon detecting this or another such IMS processing failure as to the UE's effort to place a VoIP call to the called party, the UE could then responsively engage in a process to attempt placement of the VoIP call instead through one of the alternate VoIP call services.

To facilitate this, the UE could first check to determine if the called party is registered with and possibly accessible through one or more such alternate VoIP call services. For instance, given the dialed telephone number of the called party and/or an associated address-book name, the UE could use an API respectively of each of one or more of the alternate VoIP applications 86 to inquire whether the called party is registered with the associated alternate VoIP call service and perhaps if the called party is online and thus possibly available to receive a VoIP call through that alternate service. Alternatively, if the address book application 82 includes such service-association and/or status information for the called party, the UE may query the address book to make the determination.

If the UE determines that the called party is registered with at least one of the alternate VoIP call services, then, based at least on that determination, the UE could proceed to attempt placement of the call using that VoIP call service, perhaps after first prompting for and receiving user approval to do so. For instance, the UE could likewise use an API of the associated VoIP application 86 to cause that application to place a VoIP call to the called party. Executing that VoIP application 86, the UE could thus engage in signaling with the associated VoIP call service to place the VoIP call to the called party, which may succeed. Alternatively, if this attempt does not succeed, the UE may then attempt the call placement using a different one of the alternate VoIP applications.

Note that in this process, the UE's signaling with and ultimate VoIP communication through the alternate VoIP call placement service would likely pass along the UE's default Internet bearer, as this VoIP call would not make use of the IMS 20 with associated setup of a dedicated IMS bearer.

But note as well that the UE's signaling with and ultimate VoIP communication through the alternate VoIP call placement service could still use the same wireless packet data connection that the UE would have used for an IMS-based call if the IMS call placement had succeeded. For instance, the UE could be served by the same access node 12, with the same air-interface connection according to the same RAT, and could be served by the same core network 18, rather than transitioning to another RAT, another access node, or another core network to facilitate the call placement.

Further, note that the IMS processing failure at issue is not intended to be a scenario where the called party line is busy or unanswered but where associated call setup signaling worked as expected. For instance, if the UE attempts a VoIP call through the IMS and the called party line is busy, the UE may receive from the IMS a SIP 486 BUSY message, but that would not amount to an IMS failure assuming other signaling worked as expected.

As a variation or enhancement of the process so far described, the UE could also detect a threshold high extent of IMS processing failure and could respond by reconfiguring itself to not attempt further IMS-based call initiation for a defined backoff period. For instance, the UE could detect that at least a predefined threshold number of such IMS call placement attempts (e.g., to the same or different called parties) have experienced IMS processing failure within a predefined period of time. And the UE could respond to that condition by so reconfiguring itself.

The UE could reconfigure itself to not attempt further IMS-based call initiation for a defined backoff period by changing the configuration setting noted above for instance to indicate that the default telephone application 84 should not place calls through the IMS 20. With this changed setting, when a user of the UE attempts to place a call to a called party using the default telephone application 84, the UE could respond to the configuration setting by forgoing placement of the call via the IMS and instead placing the call using an alternate VoIP application 86 as discussed above. Upon expiration of a defined backoff period, the UE could then revert the configuration setting to indicate that the default telephone application 84 should place calls through the IMS 20.

In a further example implementation, a computing system that detects an IMS processing failure and responsively causes one or more UEs to forgo use of the IMS 20 for VoIP call placement could be provided at a network entity, such as core-network entity or IMS entity in a representative SIP signaling path. Without limitation, examples of such an entity could include the P-CSCF 42 or the PGW 20, and the computing system could comprise a processing unit (e.g., one or more microprocessors) programmed with instructions to operate accordingly.

A representative such network entity could detect an IMS processing failure in various ways. Without limitation, for instance, the network entity could detect an IMS processing failure by detecting an IMS signaling overload condition related to SIP signaling of threshold many UEs, which could suggest that the IMS is experiencing a failure condition. For example, the entity could detect that at least a predefined threshold number of UEs per unit time have each been sending at least a threshold great number of SIP messages (e.g., SIP REGISTER messages or SIP INVITEs repeated for a same call) per unit time, and the entity could deem that to represent an IMS processing failure. Here, the threshold number of UEs per unit time and SIP messages per unit time could be selected to represent a likely overload condition.

A network entity such as the P-CSCF 42 that is actively and directly involved in SIP signaling with UEs could perform this analysis by reading and keeping track of SIP signaling messages on a per UE basis. For instance, the P-CSCF 42 could keep a record per UE of how many SIP REGISTER messages the UE sends per unit time and/or how many repeat SIP INVITE messages the UE sends for given calls, among other possibilities. Based on these or other such records, the P-CSCF 42 can thereby detect when an example IMS overload condition is likely to exist as noted above.

Whereas, a network entity such as the PGW 20 that is in the SIP signaling path but that is not itself actively involved in SIP signaling could perform deep packet inspection of packets flowing through the entity and likewise keeping records and detecting when a likely overload condition exists.

When a network entity detects an IMS processing failure such as a likely IMS overload condition for instance, the network entity could responsively engage in signaling to cause one or more UEs to forgo use of the IMS for VoIP call placement, which could lead to the one or more UEs instead using alternate VoIP services to place their VoIP calls as noted above.

By way of example, the entity could generate and transmit to each of the one or more UEs, and perhaps to one or more other IMS-registered UEs, a SIP 5xx error message including a cause code and backoff time period, to which each such UE may respond by backing off from use of the IMS for the indicated time period. Alternatively, if possible, the entity could invoke core-network control-plane signaling to each such UE with a directive or other indication to which the UE may similarly respond by backing off from use of the IMS for the indicated time period. For instance, the PGW 20 may transmit control signaling via the SGW 18 to the MME 32, which the MME 32 may forward in a network access stratum (NAS) message to the UE.

Note also that various operations discussed above could also be carried out with respect to one or more UEs that communicate through an access network other than a cellular wireless communication network, provided that the such a UE is configured by default to place VoIP calls via the IMS. For instance, the operations could apply with respect to UEs that communicate through a WiFi connection. In that scenario as well, a computing system could respond to detecting an IMS failure by causing one or more such UEs to forgo using the IMS for VoIP call placement, which could instead cause each such UE to place their VoIP calls using one or more alternate VoIP services such as those noted above.

Figure 4:
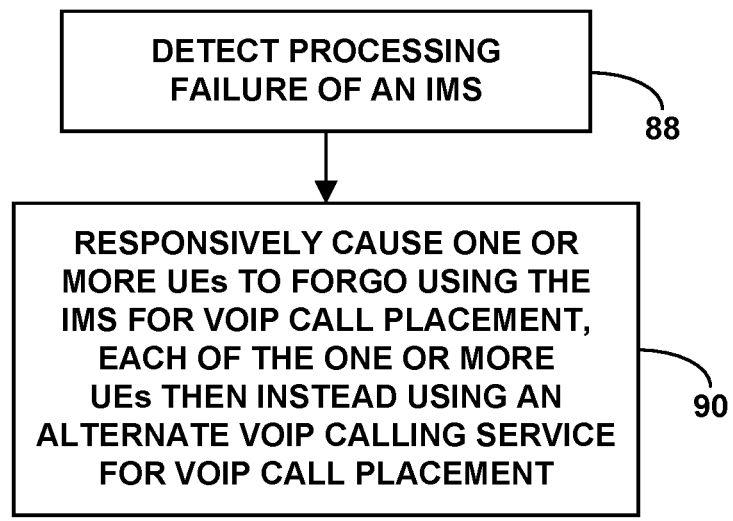
FIG. 4 is a flow chart depicting an example method that could be carried out in accordance with the disclosure.

FIG. 4 is a flow chart depicting an example method that could be carried out in accordance with this disclosure, for responding to a processing failure of an IMS. As shown in FIG. 4, at block 88, the method includes a computing system detecting the processing failure of the IMS. And at block 90, the method includes, responsive to at least the detecting of the processing failure of the IMS, the computing system causing one or more UEs to forgo using the IMS for VoIP call placement, each of the one or more UEs then instead using an alternate VoIP calling service for VoIP call placement.

In line with the discussion above, the one or more UEs in this method could be a given UE, and the computing system could be at that given UE, such as a programmed host processor of the UE. Further, the given UE could be configured by default to use the IMS for VoIP call placement. And the act of detecting the processing failure of the IMS could involve the given UE detecting the processing failure of the IMS with respect to one or more VoIP call placement attempts by the given UE using the IMS.

Further, as discussed above, the act of detecting the processing failure of the IMS with respect to the one or more VoIP call placement attempts by the given UE using the IMS could involve detecting for each such VoIP call placement a failure by the given UE to receive one or more expected VoIP call setup signaling messages (e.g., SIP messages such as a SIP 183 SESSION PROGRESS, a SIP 180 RINGING, and a SIP 200 OK) from the IMS.

Still further, as discussed above, the act of detecting the processing failure of the IMS with respect to the one or more VoIP call placement attempts by the given UE could involve detecting the processing failure of the IMS with respect to a threshold quantity of VoIP call placement attempts by the given UE, the threshold quantity being at least two. And the act of causing the given UE to forgo using the IMS for VoIP call placement could involve the given UE reconfiguring itself to not use the IMS for VoIP call placement.

Yet further, as discussed above, the act of detecting the processing failure of the IMS with respect to the one or more VoIP call placement attempts by the given UE could involve detecting the processing failure of the IMS with respect to at least one attempt by the given UE to call a given party. And the act of causing the given UE to forgo using the IMS for VoIP call placement could involve the given UE causing itself to avoid using the IMS for a next attempt by the given UE to call the given party and to instead use the alternate VoIP calling service for the next attempt by the given UE to call the given party.

As additionally discussed above, the act of the given UE instead using the alternate VoIP calling service for the next attempt by the given UE to call the given party could involve the given UE determining that the given party is registered to receive VoIP calls through the alternate VoIP calling service and, based at least on the determining, the given UE performing the next attempt using that alternate VoIP calling service.

Further, as discussed above, the one or more VoIP call placement attempts by the given UE could be made by the given UE through an air-interface connection between the given UE and an access node of a cellular wireless communication system, and through a core network of the cellular wireless communication system that provides connectivity between the access node and the IMS. And the act of the given UE avoiding using the IMS for the next attempt by the given UE and instead using the alternate VoIP calling service for the next attempt by the given UE could involve the given UE making the next attempt through the same air-interface connection and core network, perhaps through a general Internet bearer established for the UE.

Alternatively as discussed above, the computing system that carries out this method could be at a network entity other than the UE, such as at a network entity within a VoIP call setup signaling path through which the UE engages in IMS-based call setup signaling. For instance, the network entity could be a CSCF such as one of those noted above, or a gateway function of a user-plane subsystem of a core network through which the UE engages in the IMS-based call setup signaling (e.g., a PGW, SGW, UPF, etc.), among other possibilities.

In this alternative implementation, the act of the computing system detecting the processing failure of the IMS could involve detecting a signaling overload of the IMS, such as detecting that at least predefined threshold many UEs per unit time have transmitted at least predefined threshold many IMS signaling messages per unit time to the IMS. And as noted above, examples of these signaling messages could include SIP REGISTER messages and SIP INVITE messages.

Figure 5:
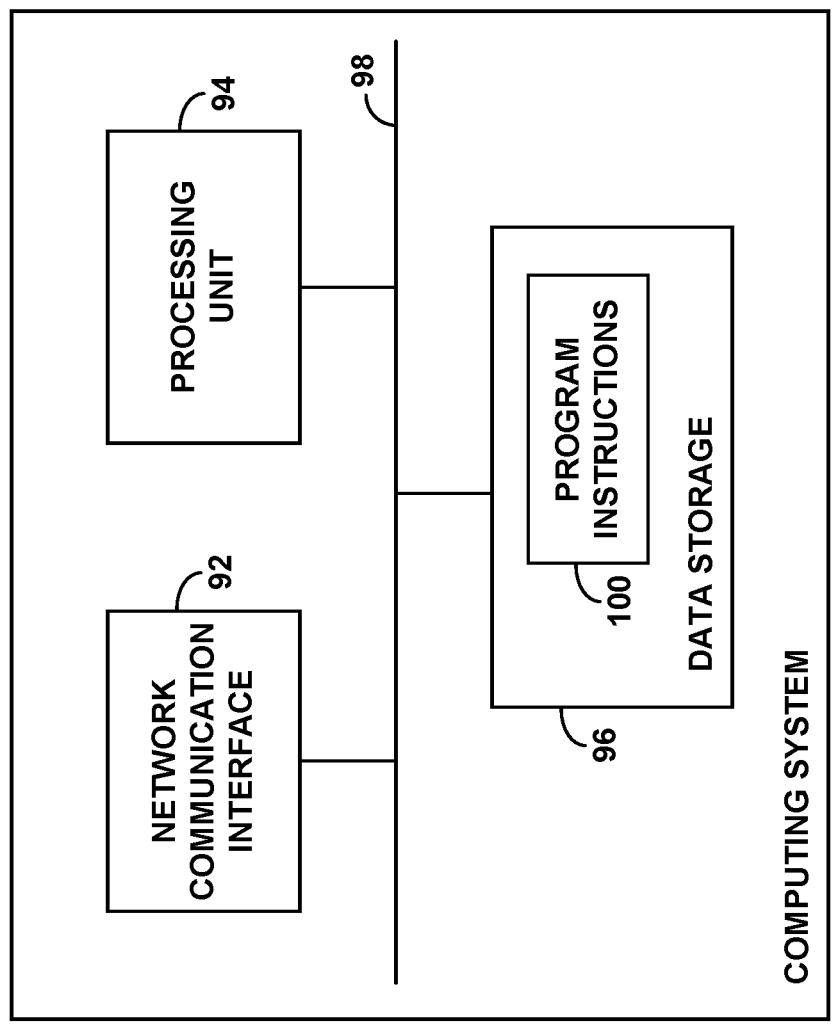
FIG. 5 is a simplified block diagram of an example computing system operable in accordance with the disclosure.

Finally, FIG. 5 is a simplified block diagram of an example computing system that could carry out various operations a described herein, such as the method of FIG. 4 for instance. As shown in FIG. 5, the example computing system includes network communication interface (e.g., a wired and/or wireless communication interface) 92, a processing unit (e.g., one or more microprocessors or specialized processing units) 94, and non-transitory data storage (e.g., one or more volatile and/or non-volatile storage components, such as magnetic, optical, or flash storage) 96, all of which could be integrated together or communicatively linked by a system bus or other connection mechanism 98.

As further shown, the non-transitory data storage 94 could hold program instructions 100. These program instructions 100 could be executable by the processing unit 94 to carry out various operations described herein, such as those described above with respect to FIG. 4.

Various features described above could be implemented in this context, and vice versa. For example, the one or more UEs could be the given UE, the computing system could be disposed at the given UE, and the given UE being configured by default to use the IMS for VoIP call placement. Further, the act of causing the given UE to forgo using the IMS for VoIP call placement could involve the given UE causing itself to forgo using the IMS for VoIP call placement and to instead use the alternate VoIP calling service for VoIP call placement. And alternatively, the computing system could be disposed in an IMS signaling path through which the one or more UEs is configured to engage in IMS signaling.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

We claim:

1. A method for responding to a processing failure of an Internet Protocol (IP) Multimedia Subsystem (IMS), the method comprising:
  detecting, by a computing system, the processing failure of the IMS, wherein detecting the processing failure of the IMS comprises detecting a signaling overload of the IMS, wherein detecting the signaling overload of the IMS comprises detecting that at least predefined threshold many UEs per unit time have transmitted at least predefined threshold many IMS signaling messages per unit time; and
  responsive to at least the detecting of the processing failure of the IMS, causing, by the computing system, one or more user equipment devices (UEs) to forgo using the IMS for voice over IP (VoIP) call placement, wherein each of the one or more UEs would instead use an alternate VoIP calling service for VoIP call placement.

2. The method of claim 1, wherein the computing system is at a network entity through which UEs engage in IMS-based call-setup signaling.

3. The method of claim 2, wherein the computing system is at a call session control function (CSCF) of the IMS.

4. The method of claim 2, wherein the network entity is selected from the group consisting of a firewall, a router, and an IMS node.

5. The method of claim 2, wherein the computing system is at a gateway function in a core network through which the UEs engage in the IMS-based call-setup signaling.

6. The method of claim 1, wherein the signaling messages comprises messages selected from the group consisting of Session Initiation Protocol (SIP) REGISTER messages to the IMS and SIP INVITE messages.

7. The method of claim 1, wherein causing the one or more UEs to forgo using the IMS for VoIP call placement comprises generating and transmitting to each of the one or more UEs a message causing the UE to back off from using the IMS for a time period.

8. A computing system comprising:
  a processing unit;
  non-transitory data storage; and
  program instructions stored in the non-transitory data storage and executable by the processing unit to carry out operations including:
    detecting a processing failure of an Internet Protocol (IP) Multimedia Subsystem (IMS), wherein detecting the processing failure of the IMS comprises detecting a signaling overload of the IMS, wherein detecting the signaling overload of the IMS comprises detecting that at least predefined threshold many UEs per unit time have transmitted at least predefined threshold many IMS signaling messages per unit time, and
    responsive to at least the detecting of the processing failure of the IMS, causing one or more user equipment devices (UEs) to forgo using the IMS for voice over IP (VoIP) call placement, wherein each of the one or more UEs would instead use an alternate VoIP calling service for VoIP call placement.

9. The computing system of claim 8, wherein the computing system is at a network entity through which UEs engage in IMS-based call-setup signaling.

10. The computing system of claim 9, wherein the computing system is at a call session control function (CSCF) of the IMS.

11. The computing system of claim 9, wherein the network entity is selected from the group consisting of a firewall, a router, and an IMS node.

12. The computing system of claim 9, wherein the computing system is at a gateway function in a core network through which the UEs engage in the IMS-based call-setup signaling.

13. The computing system of claim 8, wherein the signaling messages comprises messages selected from the group consisting of Session Initiation Protocol (SIP) REGISTER messages to the IMS and SIP INVITE messages.

14. The computing system of claim 8, wherein causing the one or more UEs to forgo using the IMS for VoIP call placement comprises generating and transmitting to each of the one or more UEs a message causing the UE to back off from using the IMS for a time period.

15. A non-transitory computer-readable medium having stored thereon instructions executable by at least one processing unit to carry out operations comprising:
  detecting a processing failure of an Internet Protocol (IP) Multimedia Subsystem (IMS), wherein detecting the processing failure of the IMS comprises detecting a signaling overload of the IMS, wherein detecting the signaling overload of the IMS comprises detecting that at least predefined threshold many UEs per unit time have transmitted at least predefined threshold many IMS signaling messages per unit time; and
  responsive to at least the detecting of the processing failure of the IMS, causing one or more user equipment devices (UEs) to forgo using the IMS for voice over IP (VoIP) call placement, wherein each of the one or more UEs would instead use an alternate VoIP calling service for VoIP call placement.

16. The non-transitory computer-readable medium of claim 15, wherein the computing system is at a network entity through which UEs engage in IMS-based call-setup signaling.

17. The non-transitory computer-readable medium of claim 16, wherein the computing system is at a call session control function (CSCF) of the IMS.

18. The non-transitory computer-readable medium of claim 16, wherein the network entity is selected from the group consisting of a firewall, a router, and an IMS node.

19. The non-transitory computer-readable medium of claim 16, wherein the computing system is at a gateway function in a core network through which the UEs engage in the IMS-based call-setup signaling.

20. The non-transitory computer-readable medium of claim 15, wherein the signaling messages comprises messages selected from the group consisting of Session Initiation Protocol (SIP) REGISTER messages to the IMS and SIP INVITE messages.

* * * * *